United States Patent [19]
Saracini

[11] Patent Number: 5,221,074
[45] Date of Patent: Jun. 22, 1993

[54] DEVICE TO SUSPEND AND STRING CONDUCTORS ON LOW, MEDIUM, HIGH AND EXTRA HIGH TRANSMISSION LINES

[75] Inventor: Alessandro Saracini, Rome, Italy
[73] Assignee: Tesaut S.p.A., Rome, Italy
[21] Appl. No.: 466,313
[22] PCT Filed: Sep. 23, 1988
[86] PCT No.: PCT/EP88/00859
  § 371 Date: Jun. 11, 1990
  § 102(e) Date: Jun. 11, 1990
[87] PCT Pub. No.: WO89/04560
  PCT Pub. Date: May 18, 1989
[51] Int. Cl.$^5$ .............................................. B65H 59/00
[52] U.S. Cl. ........................................ 254/134.3 PA
[58] Field of Search ................ 254/139.3 R, 134.3 PA
[56] References Cited

U.S. PATENT DOCUMENTS 4,844,419 7/1989 Danielsson ............... 254/134.3 PA

FOREIGN PATENT DOCUMENTS 32837 10/1964 Fed. Rep. of Germany ... 254/134.3 PA
576652 3/1957 Italy ........................... 254/134.3 R Primary Examiner—Robert C. Watson
Attorney, Agent, or Firm—Young & Thompson

[57] ABSTRACT

Suspension device for the stringing of electric conductors and/or cables for overhead power lines, of the type comprising a suspension frame, to be anchored to a crossarm of a tower of the line, and means for the support and sliding of the conductors and/or cables, said support and sliding means comprising, for each conductor or cable, a plurality of support rollers rotating about parallel pins, said rollers being aligned one after the other along a curved trajectory and defining an ideal support and sliding surface for the conductor or cable. According to the invention, the support rollers for each conductor are divided in two groups forming two trajectory sectors; the two trajectory sectors supporting each conductor are mounted on the suspension frame in specular symmetry in respect of the central vertical suspension axis of said frame, said two trajectory sectors being mutually spaced; lifting and lowering means are moreover associated to said trajectory sectors, to move the trajectory sectors in a substantially vertical direction.

37 Claims, 11 Drawing Sheets

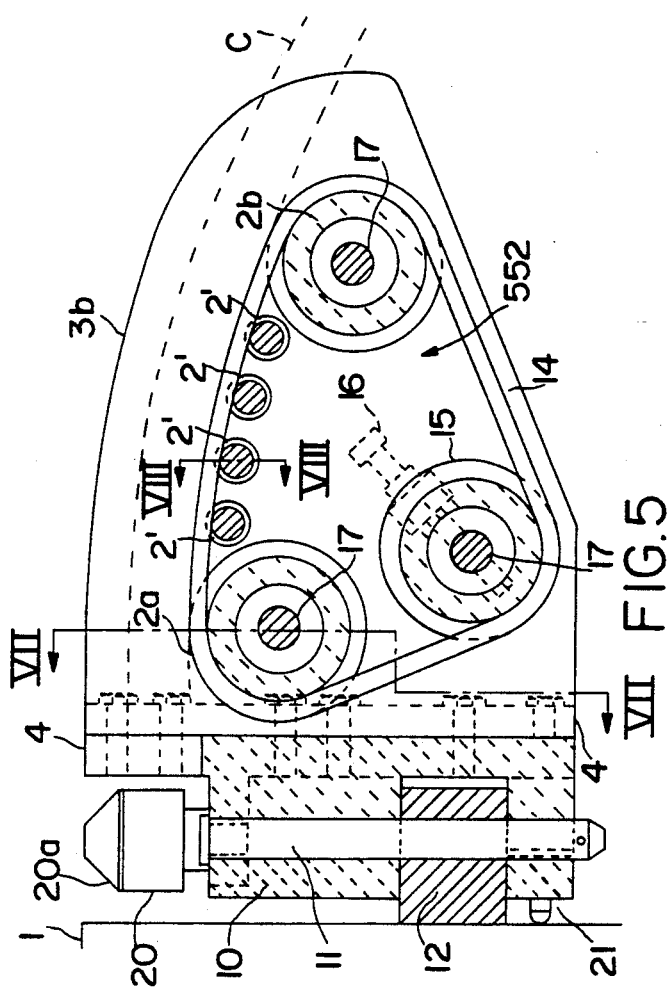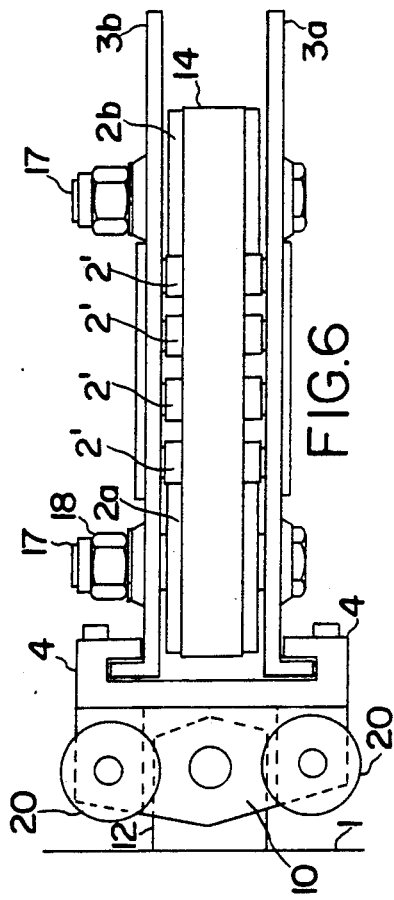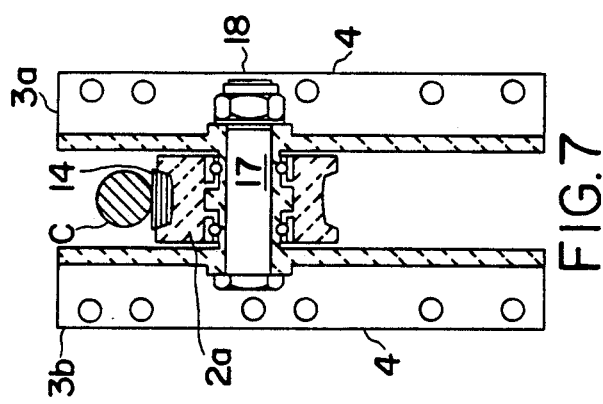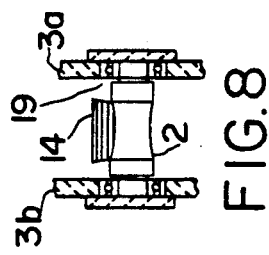

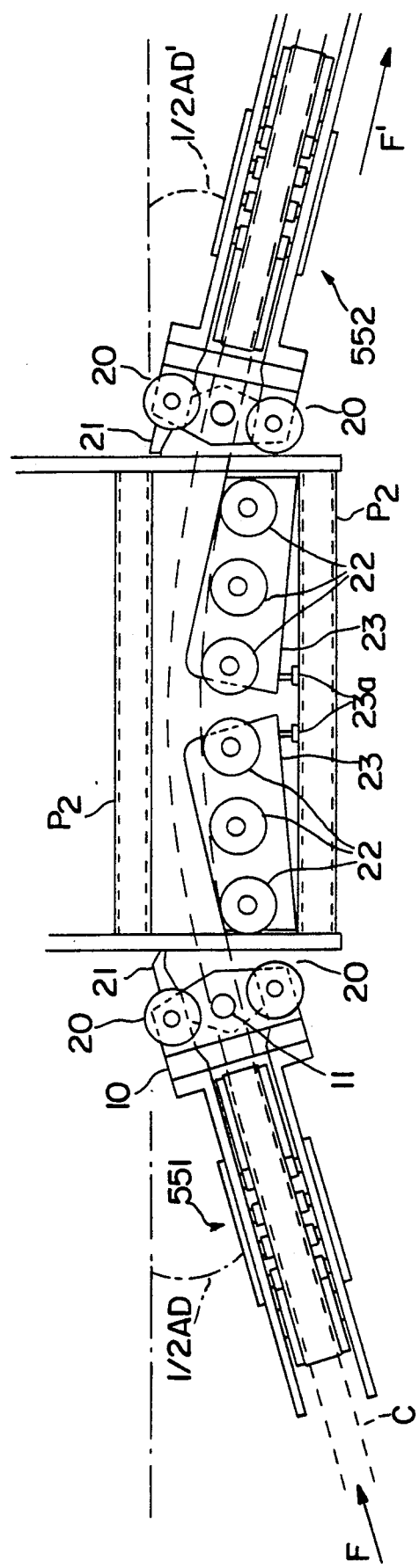

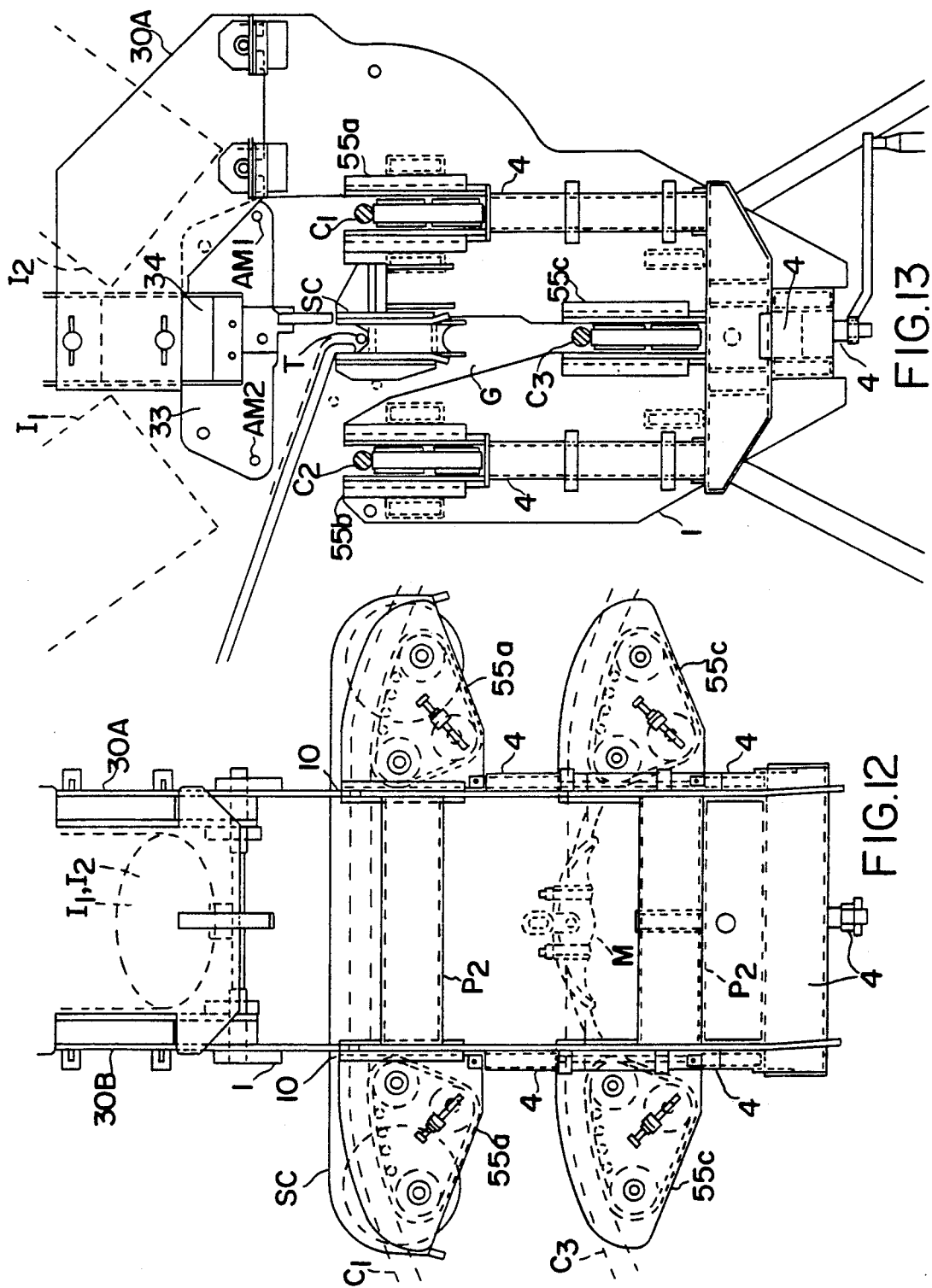

DEVICE TO SUSPEND AND STRING CONDUCTORS ON LOW, MEDIUM, HIGH AND EXTRA HIGH TRANSMISSION LINES

FIELD OF THE INVENTION

The invention relates to a suspension device that allows to support and string conductors on low, medium, high, and extra high transmission lines.

BACKGROUND OF THE INVENTION

It is well known to the experts in the art of power lines construction that the stringing and clamping-in procedures usually comprise the following operations:

position one pulley per each crossarm of each tower and suspend each of said pulleys from the strings of insulators hanging from each crossarm, lay on the ground one service cable per each phase of the power line according to the layout of the towers, lift and position each service cable on each respective pulley, tension each of said service cables from one end by means of a winch and from the other end by means of a brake, pull the service cables by means of said winch, and replace each service cable with a conductor and/or a larger draw cable if a bundle of conductors has to be positioned per each phase of the line, position all conductors and/or bundles of conductors on their respective pulleys, while keeping said conductors and/or bundles of conductors always under tension and therefore always raised from the ground, pull the conductors and/or bundles of conductors by means of said winch till they reach the prescribed degree of tension (pre-sagging) (if longitudinal unbalances are present the pre-sagging of the conductors at this stage cannot be the equal to the final and correct sagging), if longitudinal unbalances are present, due to the fact that the power line is crossing mountains and/or the distance between towers is not constant, calculate said longitudinal unbalances, and mark the plumb-point on each conductor so that once the conductors have been clamped-in to said insulators, the insulators will be plumbed and the conductors sagged, temporarily lift, by means of one or more tackles, the conductor and/or each conductor of a bundle from the grooves of a pulley, remove said pulley, clamp-in the conductor and/or conductors to the insulators, and once all conductors have been clamped-in to the insulators of all towers between the brake and the winch, control, and often adjust, the sagging of said conductors.

It is to be understood that when longitudinal unbalances are present, before the crews can proceed with the last described operation, that is to say before they can clamp-in the conductors, said tackles have to be used not only to lift the conductors from the pulleys, but also to pull said conductors, with repeated operations, in order to recover the calculated differences between the "rest" position of the conductors on the pulley and the final clamp-in points. This additional operation has to be carried out with absolute accuracy so that once said conductors have been clamped-in to the insulators of all towers between the brake and the winch, said insulators will remain perfectly plumbed, and only vertical loads will be imposed to the crossarms of suspension towers.

There are many difficulties related to the stringing of power lines and while some of them, particularly these relating to the positioning of the service cables on the towers, have been faced and solved for example as described in the U.S. Pat. No. 4,596,379 (Europe N.56285) of the same assignee, patent that can be referred to for a better understanding of state of the art of the different stringing methodologies, the others, and particularly those relating to the clamping-in and plumbing operations, have been faced, but not solved.

The difficulties relating to the clamping-in of the conductors to the insulators, as partially explained, are the following:

1. stringing conductors on angle towers, that is to say on towers which cause the conductors to run on different vertical planes, causes the pulleys to be displaced to a non-vertical position. The displacement of the pulleys, in its turn, causes the conductors to cross the grooves of the pulley. In fact, while the two catenaries adjacent to the tower are points. This additional operation has to be carried out with absolute accuracy so that once said conductors have been clamped-in to the insulators of all towers between the brake and the winch, said insulators will remain perfectly plumbed, and only vertical loads will be imposed to the crossarms of suspension towers.

There are many difficulties related to the stringing of power lines and while some of them, particularly those relating to the positioning of the service cables on the towers, have been faced and solved for example as described in the U.S. Pat. No. 4,596,379 (Europe N.56285) of the same assignee (that patent that can be referred to for a better understanding of state of the art of the different stringing methods), the problems relating to the clamping-in of the conductors to the clamps of the insulator chain, while keeping the conductors always under tension have been faced, but not solved.

The difficulties relating to the clamping-in of the conductors to the insulators, as partially explained, are the following:

1. stringing conductors on angle towers, that is to say on towers which cause the conductors to run on different vertical planes, causes the pulleys to be displaced to a non-vertical position. The displacement of the pulleys, in its turn, causes the conductors to cross the grooves of the pulley. In fact, while the two catenaries adjacent to the tower are contained on perfectly vertical planes, the plane on which the pulley sheaves rotate is (in these cases) always sloped. Consequently, the conductors simultaneously touch the grooves of the pulley in points with different peripheral speeds undergoing continuous abrasions and torsions which should not be allowed in order to preserve their integrity.

2. When longitudinal unbalances are not present, the points where the conductors rest in the grooves of the pulleys coincide with the points where the suspension clamps have to be inserted for clamping-in. Consequently, said points of the conductors cannot be accessed by the crews for clamping-in without first having to temporarily lift said conductors and remove the pulleys.

3. When longitudinal unbalances are present, the clamping-in points do not coincide with the points where the conductors rest in the grooves of said pulleys, but on the contrary they often are various meters away from said rest-points. In these cases, the final sagging, clamping-in, and plumbing operations always require the processing of complicated calculations and the execution of difficult operations to be carried out exclusively on the towers in order to:

recover said longitudinal unbalances on line towers, recover said longitudinal unbalances even on angle towers while for example also compensating for the different lengths of the conductors in a bundle, and clamp-in the conductors according to a specific geometric configuration. In addition to the complicated operations required to undo said longitudinal balances, these cases too always require to first temporarily lift the conductors from the pulleys, using numerous and supplementary pieces of equipment, and then remove the pulleys before clamping-in.

4. The sagging, plumbing, and clamping-in operations briefly described in point 3, can get to be so complicated that in the end, many times, they turn out to be mostly trial and error operations. Many times, after the conductors have been clamped-in to all towers, said conductors will still be not perfectly sagged. In these cases the crews will have to go back from tower to tower and adjust the clamp-in points till said conductors will be perfectly sagged and all insulators perfectly plumbed.

In the Italian patent N.1191291, of the same assigned, the problems and difficulties listed in points 1 and 2 had been dealt with through the use of common pulley sheaves which had been mounted specularly on a special frame. Even though said pulley-units in theory partially solved some of the mentioned inconveniences and difficulties, they required the use of many pulley sheaves having diameter at least equal to 80 cm.. The number of pulley sheaves required was more than double the number of conductors in a bundle, in fact for example in the described case of a bundle of eight conductors the pulley-unit was composed by twenty pulley sheaves, sixteen of which had diameter equal to 80 cm.. The number of pulley sheaves, their diameter, and the heavy structure of the frame added up to an enormous increase of the weight, size, and manufacturing costs of the whole unit. In addition, the weight and size of the unit also created considerable difficulties to transport it to the towers and suspend it from the insulators. Because of these reasons and other technical problems, the use of the pulley units described was completely inefficient, uneconomic, and unjustifiable.

The present invention offers the best and most practical solution to the difficulties listed in points from 1 to 4 and the technical and operative/economic problems related to the pulley-units described in the Italian patent N.1191291. The present invention relates to: 1) the general stringing method, because the clamping-in and sagging operations have been substantially changed and; 2) the structure of the suspension devices that allow to string the service cables and/or conductors.

The new structure of the suspension devices, according to the present invention, allows: 1) the conductors and/or cables to freely run on said devices while stringing, 2) the insulators to be automatically and perfectly plumbed and the conductors to be automatically and perfectly sagged without the need of manual interventions and/or counterweights, and 3) the conductors to be directly clamped-in without the need of either lifting said conductors from their rest-position or using temporary and supplementary equipment. All being accomplished while at the same time decreasing both the size and the weight of the suspension units. It is also to be noticed that the structure of the suspension units, according to the present invention, also allows to position all clamps necessary for the clamping-in operations within each suspension unit further decreasing work time, and further simplifing the job to be carried out by the crews.

It is well known, that pulleys and/or pulley units commonly used generally comprise: 1) a large suspension frame, to be suspended from the insulators often in correspondence of at least one of the holes designed for receiving the suspension clamps, in other words often occupying at least one of the clamp-in points, and 2) one or more pulley sheaves.

The diameter of these pulley sheaves is usually very large, greater for example than 60 cm. and often even greater than 100 cm.. in order to allow the conductors to run on said sheaves without bending too much. Because of the present trend of using conductors with larger diameters, the pulley sheaves are also tending to have larger diameters.

The just mentioned facts together with the tendency of using one bundle of conductors per each phase of the line, rather than one single conductor, are the reasons why the commonly used pulleys have become larger and heavier. In fact, the commonly used pulleys, for example for a bundle of three conductors, weigh approximately 150-200 Kg., while the pulley unit for a bundle of eight conductors, described in the Italian patent N.1191291, weighs approximately 1,500 Kg., and/or about 500 Kg. in the not described case of a unit for three conductors. The weight of the commonly used pulleys and/or pulley units described in said patent is not only an inconvenience from the manufacturing/cost point of view, but more than anything else from the point of view of their practical use on site. The pulleys and/or pulley units have to be transported along the power line, often in areas which cannot be reached by road and/or cross country vehicles, lifted and suspended from the insulators for stringing, and finally transported again to another tower. It is quite obvious that when a pulley and/or pulley unit weighs more than 150-200 Kg. and/or more than 500-1,500 Kg. the transportation and lifting problems can become particularly burdensome.

As mentioned earlier, another serious problem related to the use of the common pulleys derives from the difficulty of clamping-in the conductors, both because of the reasons explained in points from 1 to 4, and because of the fact that often at least one of the clamp-in points has been occupied by the frame of the pulley. If using the common pulleys for stringing is therefore necessary to first remove said pulleys from their suspension point and then clamp-in the conductors. For these operations, to be repeated for each pulley of each tower, the procedure is usually the following: first, temporarily lift the conductor and/or conductors, by means of one or more tackles and bring said conductor and/or bundle of conductors in position to be clamped-in, secondly remove the pulley and bring it to the ground, and finally clamp-in the conductor and/or bundle of conductors to the insulators at the "right" points. These are very complicated operations particularly in consideration of the fact that the weight of each conductor to be temporarily lifted can easily be greater than 1,000 Kg. and/or greater than 2,000 Kg.. As mentioned earlier, it is important to understand that when longitudinal unbalances are present the final clamp-in points of each conductor never correspond with the rest-points of said conductors on the pulleys, but can get to be even more than 10 m. away (down-hill) from said rest-points. In these cases the tackles that are applied on each conductor to lift them from the grooves of the pulleys, have to be attached to each conductor down-hill and far away from the pulleys, in order to recover said various meters of conductors that cause the insulators to be out-of-plumb. This complicated operation also implies to impose a longitudinal stress of thousands of kilograms to each crossarm of many suspension towers, which are neither designed nor manufactured to resist to said longitudinal stress, but only to vertical loads.

Suspension system of the type comprising a small frame and a plurality of rollers disposed in continuous sequence as one sector of a crown, have been described in the U.S. Pat. No. 3,145,016 and in the French patents N.93165 and N.1104834. The primary objects of these patents were: 1) for U.S. Pat. No. 3,145,016 to allow a sector of multiple pulley assemblage to automatically change the angle of load imposed on the conductors in order not to damage said conductors while stringing, 2) for the French patent N. 1104834 to reduce the weight and size of the suspension units and 3) for the French patent N. 931675 to be able to use the same suspension unit for stringing any size conductors manually changing the position of the wheels so as to vary the angle of loads imposed on different conductors. On the other hand, none of these devices was technically fitted to be practically used on site.

In addition, none of the listed patents allowed to either clamp-in the conductors directly (and at the right point) to the insulators without first having to remove the suspension units, or to string the conductors passing through transversal angles without damaging the conductors. Moreover, none of the listed patents allowed to, automatically plumb the insulators and perfectly sag the conductors, and automatically position a bundle of conductors according to the prescribed geometric configuration, neither simultaneously on all towers between the brake and the winch, nor with one or more operations without a direct intervention of the crews on the conductors themselves.

SUMMARY OF THE INVENTION

The primary object of the present invention is to solve all the listed problems and difficulties. In other words, the new suspension units, allow on one hand to maintain a reduced size and weight of the frames, and on the other hand: 1) to automatically plumb all insulators on all towers between the brake and the winch, 2) to automatically and perfectly sag the conductors particularly if longitudinal unbalances are present, 3) to automatically position a bundle of conductors according to the prescribed geometric configuration, and 4) to clamp-in the conductors without having to temporarily lift the conductors from the suspension units, and/or remove said suspension units.

These results are obtained with a device for the suspension and stringing of conductors and/or cables for overhead power lines, of the type comprising a suspension frame, adapted to be suspended from a crossarm of a tower of the line, and means for the support and sliding of the conductors and/or cables, said support and sliding means comprising, for each conductor and/or cable, a plurality of support rollers which, rotating about parallel pins, are aligned one after the other along a curved trajectory, said rollers defining an ideal support and sliding surface for each respective conductor and/or cable. The whole suspensions device is essentially characterized by the fact that:

the support rollers for each conductor are divided in two groups of rollers forming two trajectory sectors.

the two trajectory sectors comprising the support rollers for one conductor are mounted on the suspension frame in specular symmetry in respect of the central vertical axis of said suspension frame, said two trajectory sectors being mutually spaced, lifting and lowering means being also associated to the trajectory sectors, to move said trajectory sectors in a substantially vertical direction.

BRIEF DESCRIPTION OF THE DRAWINGS

Other characteristics and advantages of the present invention will be more readily understandable after the following detailed description of some of the preferred embodiments and ways to achieve the mentioned results, illustrated, only as a way of example and not in limitative manner, in FIGS. 1 to 20 where:

FIGS. 5 illustrates in more details one of the two trajectory sectors illustrated in FIGS. 1 to 3;

FIG. 6 is a top view of the same trajectory sector;

FIG. 7 is a lateral section (VII—VII) of the trajectory sector in FIG. 5;

FIG. 8 is an other lateral section (VIII—VIII) again of the same trajectory sector;

FIG. 9 is a top view of a pair of trajectory sectors fitted to be used on angle towers;

FIG. 12 is a lateral view of more pairs of trajectory sectors mounted on one special frame;

FIG. 13 is a front view of the suspension device illustrated in FIG. 12;

DETAILED DESCRIPTION OF THE INVENTION

Figure 1:
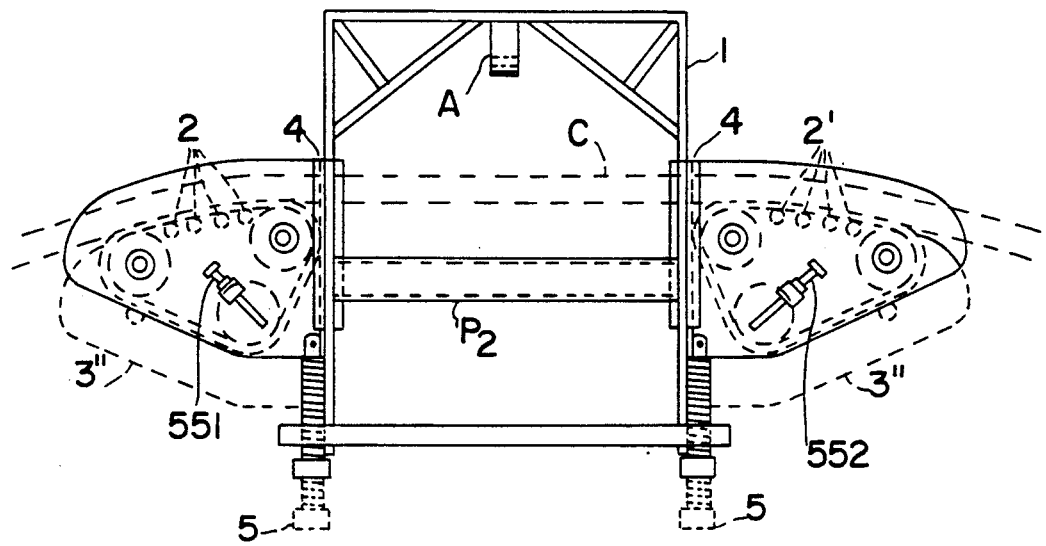
FIGS. 1 to 4 are schematic lateral views of different pairs of trajectory sectors.
Figure 2:
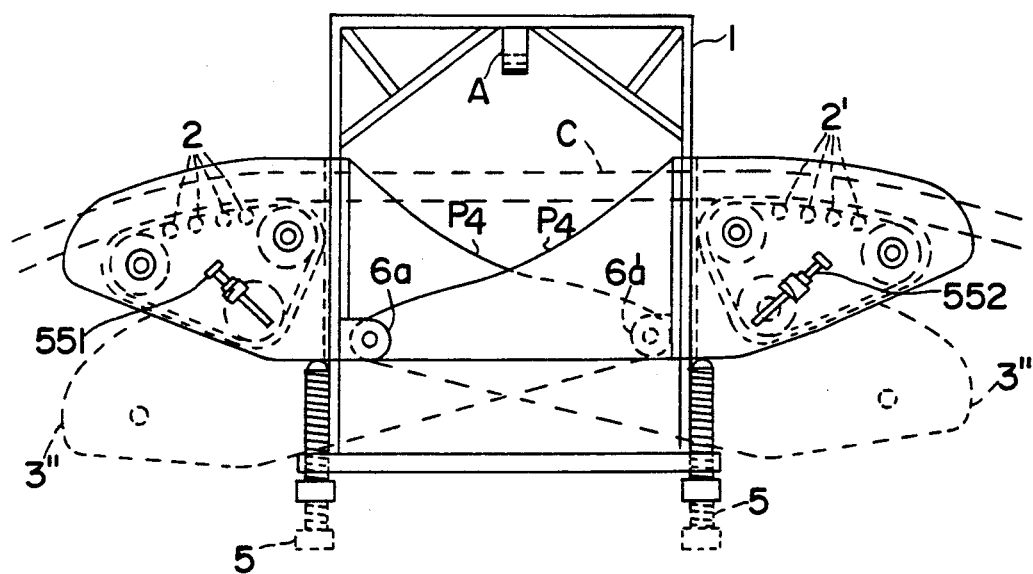
Figure 3:
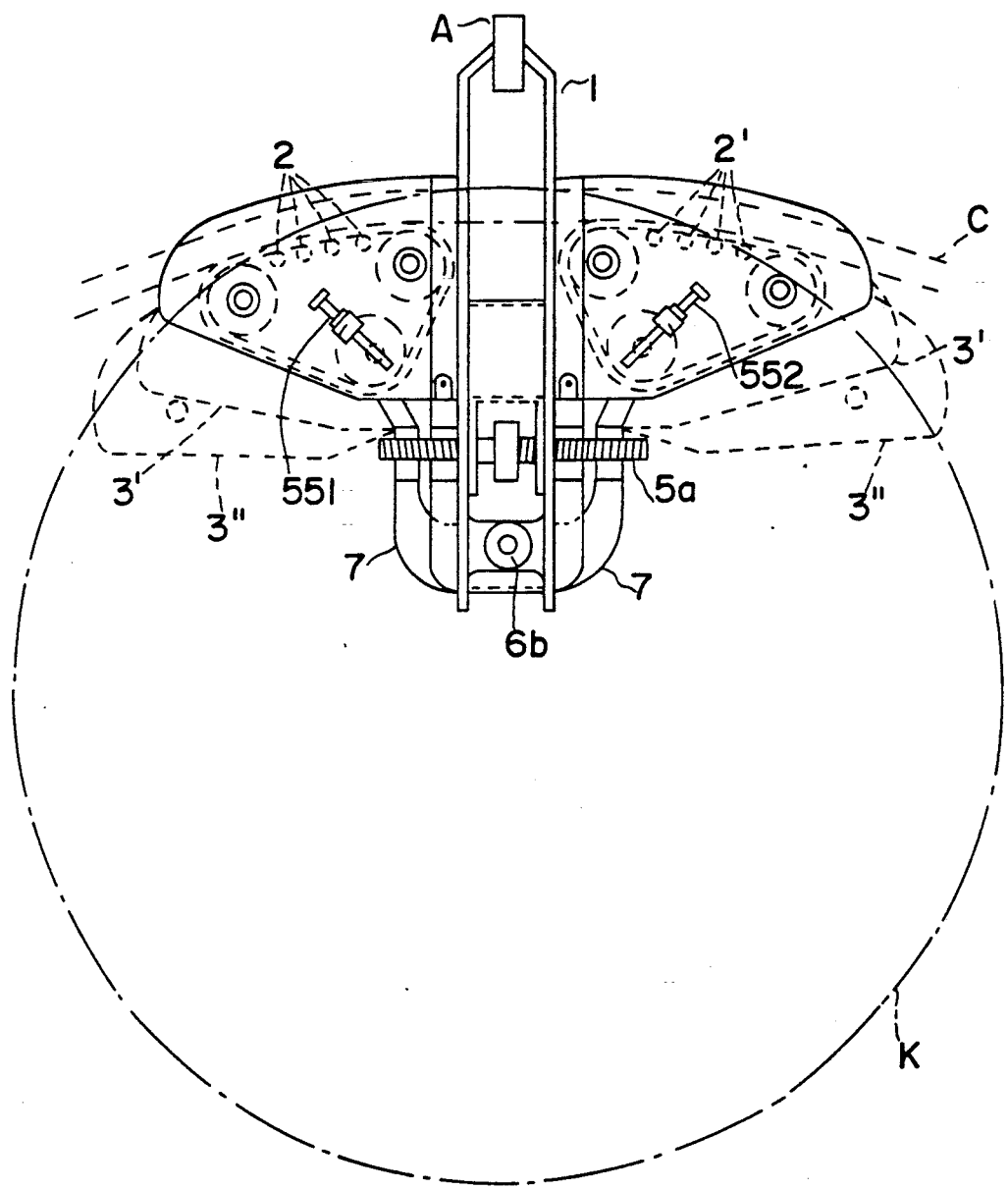

The first three possible variants, according to the present invention, of the device for the suspension of the cables and/or conductors are illustrated in FIGS. 1 to 3. In these three figures the device is mounted on a frame (1), and is substantially made up of two series of rollers (2) and (2') which disposed, according to the first important characteristic of the present invention, so as to form two separate trajectory sectors (SS1) and (SS2), are spaced specularly from one an other. It is to be noticed that by mounting more than one pair of trajectory sector on each frame, the same frame can be used for the stringing and suspension of more than one cable and/or conductor (C). The top of frame (1) is connected to a special interface (A) which is required to hang said frame from the lower end of one or more strings of insulators.

More partricularly, FIG. 1 shows that the two trajectory sectors (SS1) and (SS2) are spaced from one another by means of two connecting bars (P2) (only one can be seen). The device, comprising the two trajectory sectors and the two bars (P2), is mounted on said frame (1) by means of slides (4) that allow the parallel/vertical lifting and/or lowering of the trajectory sectors along the sides of frame (1). Once the conductor (C) has been clamped-in to the insulators (not shown), by inserting the clamp (not shown) in the central space between said trajectory sectors, the two trajectory sectors (SS1) and (SS2) can be unloaded of the weight of the conductor by acting on screws (5) which control said slides (4). Once the trajectory sectors (SS1) and (SS2) have reached the position (3") (illustrated with the dotted line), the whole suspension unit, including the frame, can be easily removed.

FIG. 2 shows an alternative to plates (P2) and slides (4) of FIG. 1. In this case, the two trajectory sectors (SS1) and (SS2) are spaced by means of four plates (P4) hinged to points (6a) and (6a') of frame (1). Once the conductor has been clamped-in, as explained for FIG. 1, the two trajectory sectors are lowered to position (3"), again by acting on screws (5), but this time thanks to their rotation about points (6a) and (7a'), rather than slides (4).

The last alternative for the spacing of said trajectory sectors (SS1) and (SS2) is illustrated in FIG. 3. Here, the two trajectory sectors are hinged to the base of frame (1) through a common pin (6b) and extension arms (7). In this case the connecting plates (P2) and/or (P4) have been eliminated, the frame is even smaller, but the central space between the two trajectory sectors (SS1) and (SS2) is not large enough to allow the insertion of said clamp. Once the conductor has been suspended from a series of towers, and is therefore lying on a series of trajectory sectors (SS1) and (SS2), before it can be clamped-in, said trajectory sectors have to be first moved to position (3'), by acting on screw (5a). At this point the suspension clamp can be inserted and the conductor clamped-in. Once the conductor has been clamped-in, trajectory sectors (SS1) and (SS2) are moved to position (3") by acting once again on said screw (5a). In this case thanks to screw (5a), which has a double thread, and extension arms (7), the rotation of trajectory sectors (SS1) and (SS2) is eccentric.

Figure 4:
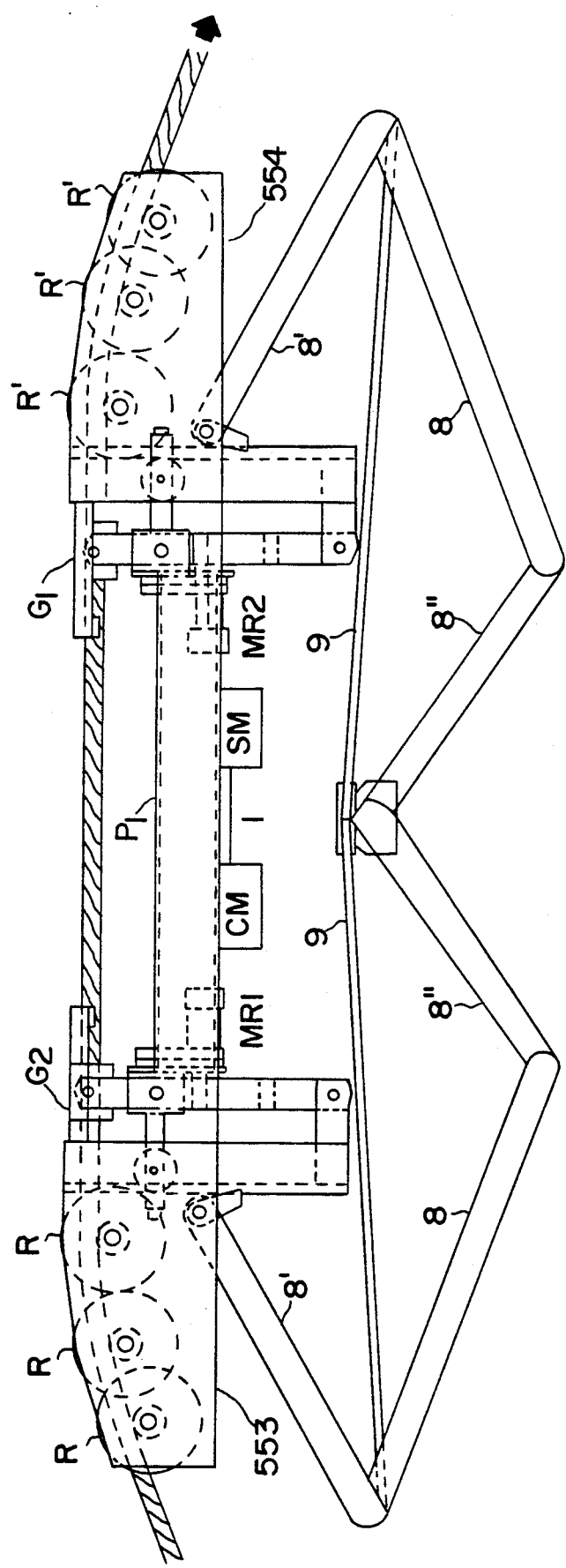

FIG. 4 illustrates the preferred solution for the spacing lifting and lowering of two, also preferred, trajectory sectors. A pair of trajectory sectors (SS3) and (SS4) are here spaced from one an other by means of one steel, or alloy channel section (P1) which is also used to store at least one suspension clamp (not shown). The lifting and/or lowering of the two trajectory sectors together with element (P1) is neither achieved by slides (4) (FIG. 1), nor by the hinges illustrated in FIGS. 2 and/or 3, but by means of a bearing jack which is made up by toggle arms (8), (8'), and (8"), and one or more lead screws (9).

Thanks to the solution of using at least one bearing jack, by acting on said one and/or more lead screws (9), the motion of said two trajectory sectors (SS3) and (SS4), together with element (P1), and/or more pair of trajectory sectors of the same type, can either be: 1) parallel/vertical, for the positioning of a bundle of conductors according to some prescribed geometric configuration and/or in order to unload said couples of trajectory sectors of the weight of each conductor once said conductors have been clamped-in, and/or 2) oblique/-vertical to either position said bundle of conductors according to other prescribed geometric configurations, and/or decrease the tendency of the strings of insulators to be displaced out-of-plumb when longitudinal unbalances are present.

FIG. 4 also shows that the two trajectory sectors (SS3) and (SS4) each comprise a series of rollers (R) and (R') which spaced as shown, have different longitudinal dimensions and different profiles for the purpose better described in FIGS. 16 to 19. The dimensions of element (P1) and trajectory sectors (SS3) and (SS4) have been studied so as to allow the introduction of at least one pair of jaws (G1) and (G2) and at least one geared motor (MR1) and/or (MR2). At the right time, in a way better described later on, thanks to said geared motors, said pairs of jaws (G1) and (G2) in turn tighten and pull the conductor (C) for the automatic plumbing of the insulators, and the respective automatic sagging of the conductor itself.

As explained earlier, in FIGS. 1 to 4 the position of the trajectory sectors (SS1) and (SS2), or (SS3) and (SS4) can be changed by acting on lead screws (5), or (5a), or (9). Those figures illustrated said lead screws as if they could be hand-operated only, on the contrary, it should be understood that said lead screws could also be automatically actived by means of at least one electric geared motor. FIGS. 5 to 8 illustrate the details of trajectory sector (SS2) schematically illustrated in FIGS. 1 to 3. FIG. 7, which is section (VII—VII) of FIG. 5, and FIG. 6, which is a top view of FIG. 5, show that the support rollers (2a), (2'), and (2b), and the supplementary roller (15), are supported by two parallel plates (3a) and (3b) which in their turn are connected with slide (4). Said slide (4) is fastened with a series of screws to a base (10); while base (10) rotates about a vertical pin (11), and is sustained to frame (1) by means of bracket (12). The possible transversal rotation of base (10) and/or the whole trajectory sector (SS2) about said vertical pin (11) is in some cases utilized for the purpose better described later on in FIG. 9.

In the case illustrated in FIGS. 5 to 9, the conductor (C) does not run directly on rollers (2a), (2') and (2b), but on an endless belt (14) which is tensioned by tension-roller (15) and set screw (16).

The number of rollers on one hand, and the strength of the endless belt (14) on the other hand have been studied to ensure the right support for conductor (C) and the right distribution of loads, or in other words, to avoid a wrong concentration of loads to damage the conductor and/or the belt and/or the rollers.

Rollers (2a), (2b), and (15) rotate about pins (17) and can be easily dismounted by first unscrewing stop-nuts (18). The other rollers (2') (see FIG. 8, section VIII—VIII of FIG. 5) are instead mounted on bearings (19) fitted in special slots of plates (3a) and (3b).

Base (10) of plates (3a) and (3b) is also fitted with two additional rollers (20). The cone-shaped end (20a) of said additional rollers (20) eases the positioning of conductor (C) in the space between said rollers (20). These additional rollers (20), having vertical axis, constitute a lateral guide for the conductor (C) for the purpose better described later on.

The practical use and some of the operational advantages of the device illustrated in FIGS. 1 to 8, according to the present invention, are described in the following points a) and b), and points (I) to (III).

a) While stringing suspending cables and/or conductors on a series of towers, the new device is more or less used as a common pulley. The frame (1) though is: 1) connected and anchored to the lower end of the insulators in such a way (described for example in FIG. 12 and 13) as to not occupy the points of attachment of the conductor and/or conductors to the insulators, and 2) is supporting at least two trajectory sectors (SS1) and (SS2) and/or (SS3) and (SS4) rather than one or more pulley sheaves. The conductor and/or conductors therefore run either on said roller (R) and (R') or on said belt (14) more or less in the same way as on a common pulley sheave. In fact, rollers (2a), (2'), and (2b), or (R) describe a circular and/or elliptic guiding surface which can ensure that the conductors will not undergo and incompatible bending, due to their own weight, once suspended from the towers and supported by said semi-sectors.

On the other hand, even though the conductor and/or conductors can freely run on the new suspension device under the same conditions of commonly used pulley, the dimensions of the new suspension device are considerably smaller than said commonly used pulleys, and the weight has considerably been reduced. This can easily be seen and understood by looking at FIG. 3 where the dotted line (K) proportionally reproduces the dimensions of a commonly used pulley sheave without its respectively large supporting frame.

b) Once the conductor and/or conductors have been suspended from the towers, said conductor and/or conductors have to be clamped-in to the insulators. At this point, other essential and very important advantages of the present invention become clear. In fact, the suspension unit comprising a frame (1) and at least one pair of trajectory sectors (SS1) and (SS2) and/or (SS3) and (SS4) allows to invert the order and extremely simplify—both in terms of crews' work and the otherwise required supplementary equipment—the clamping-in operations, while improving crews' safety and the accuracy of the operations. The operations, already in the new order according to the present invention, are the following:

I. the conductors are first automatically positioned according to the prescribed geometric configuration (if required, that is to say in the case of a bundle of more than one conductor), and then permanently clamped-in to the insulators while still being safely supported by said trajectory sectors. This is done by inserting the required suspension clamps ((M) see for example FIG. 12) in the free central space between said trajectory sectors (SS1) and (SS2) and/or (SS3) and (SS4), and anchoring said clamps to the plate hanging for the lower end of said insulators (see for example plate (33) FIG. 13).

II. Once the conductors have been clamped-in, said trajectory sectors (SS1) and (SS2) and/or (SS3) and (SS4) are lowered (as for example illustrated in FIGS. 1 to 3, position (3")) by hand and/or automatically (by means of at least one electric geared motor) operating on lead screws (5), or (5a), or (9), in order to unload said trajectory sectors of the weight of said conductors.

III. Once the trajectory sectors have been lowered, the frame, together with said trajectory sectors, can easily and safely be disconnected from the insulators, and transfered either on the ground or suspended from an other crossarm.

The clamping-in operations can therefore be carried out rapidly, with simple interventions of the crews, and without the need to otherwise: lift the conductors by means of supplementary and temporary tackles, remove the pulleys leaving the conductors temporarily suspended from the ground by means of said supplementary tackles, and finally clamp-in.

FIG. 9 illustrates a top view of a pair of trajectory sectors (SS1) and (SS2) which have been fitted with additional devices for better stringing when transversal angles are present. That is to say when conductor (C) meets trajectory sector (SS1) coming from the direction indicated with arrow (F), and departs from trajectory sector (SS2) according to the direction indicated with arrow (F'), or in other words, when the conductor and/or conductors have to undertake transversal angles equal to $\frac{1}{2} AD + \frac{1}{2} AD'$.

In these cases, each trajectory sector (SS1) and/or (SS2) rotate transversally about said vertical pin (11) (see also FIGS. 5 to 8) by as many degrees as required and/or equal to $\frac{1}{2}AD$ and $\frac{1}{2}AD'$. In order to secure the right degree of transversal rotation of each trajectory sector before the conductor (C) is positioned on said trajectory sectors, setscrews (21) and/or one or more adjusting-springs can be brought into contrast with frame (1). These setscrews (21) and or the mentioned lead screws (5) can also be connected with at least one remote-controlled geared motor.

When the deviation angle between directions (F) and (F') (equal to $\frac{1}{2}AD + \frac{1}{2}AD'$) is relatively small, the four lateral rollers (20) will be enough to guide the conductor in the right direction. On the other hand, when said deviation angle is relatively large, one and/or two additional series of rollers (22), having vertical axis and being positioned according to a pre-calculated arc, can be inserted in the central space between said two trajectory sectors (SS1) and (SS2) as illustrated in FIG. 9. Plates (23), which support said additional series of rollers (22), can also be adjusted for different angles by means of setscrews (23a) and/or adjusting-springs.

Figure 10:
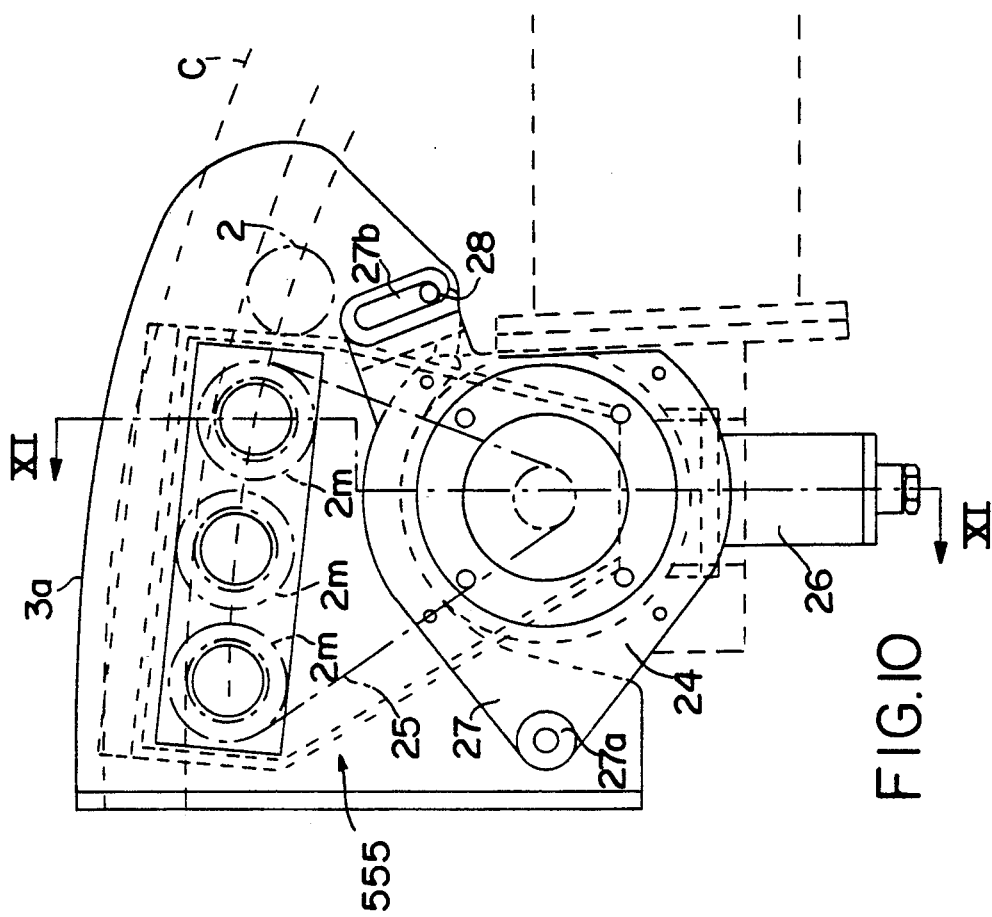
FIG. 10 is a lateral view of a trajectory sector fitted with one geared-motor.
Figure 11:
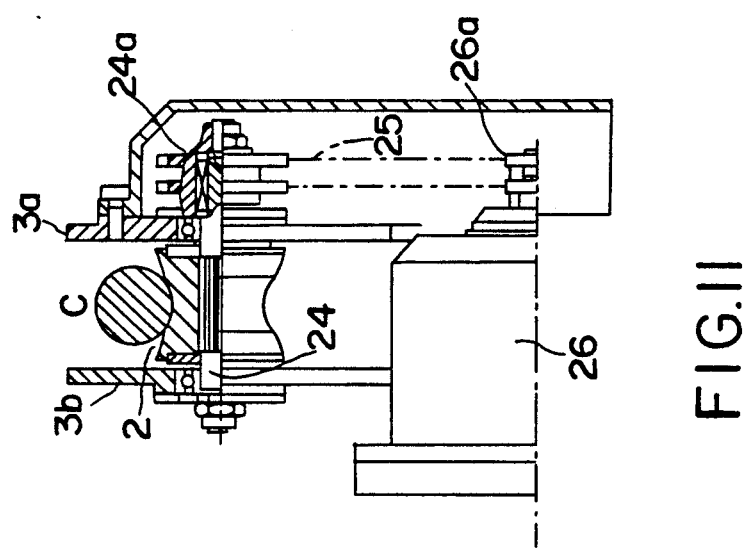
FIG. 11 is a partial section (XI—XI) of FIG. 10.

According to an other important characteristic of the present invention the rollers (2) and/or (2') of at least one of the two trajectory (SS1) and/or (SS2) could be connected, for example by means of tension roller (15), to a geared motor for the purpose better described later on. FIGS. 10 and 11 illustrate an other possible way of motorization of rollers (2m) (similar to roller (2) and/or (2')) or a trajectory sector (SS5). These figures shown that some of said rollers (2m) have been connected through their respective pins (24) (which extend beyond plate (3a)), gear (24a), chain (25), and pinion (26a), to a geared-motor (26). The endless belt (14) has been eliminated, and rollers (2m), which have been calendar-coated directly support the conductor (C). Both solutions, to either calendar-coat said rollers with suitable materials, or to cover them with said endless belt, have two functions: 1) to equally distribute the weight of the conductor on each roller, and 2) to avoid damaging the surface of the conductor and/or said rollers.

According to an other important characteristic of the present invention, the illustrated geared motor/s (26), for the automatic plumbing of the insulators and the automatic sagging of the conductors, and/or the other geared motors (not illustrated) for the automatic regulation of said lead screws, are preferably constituted by low voltage electric-motors, for example 24 Volt. This characteristic implies that said motors can either be fed by means of at least one battery, mounted on each frame (1), or by means of a single generator positioned on the ground any where between the brake and the winch. In this last case, that is to say when said electric motors are fed by means of a generator, in order to activate said geared motors it is enough to connect the negative pole of said low voltage to one tower (ground) and/or to one phase of the power line, and the positive pole to each conductor and/or cable of each phase of the power line, and/or to the conductors of at least one phase of the power line. This enables to save all the batteries, otherwise to be mounted on each frame, to feed at once all electric motors mounted on all suspension devices between the brake and the winch, and consequently to plumb all insulators and sag all conductors at once without generating any danger of the crews. In fact: 1) 95% of the times there will not be any need for any worker to be on any tower and/or to be in contact with any conductor, that is to say, 95% of the times all workers will be waiting on the ground for the operation to be completed, and 2) even though in very few cases some workers might be on some towers, the voltage will be so low (24 Volts and/or lower) that will be practically imperceptible at all effects.

Going back to FIGS. 10 and 11 again, said geared motor (26) can be mounted on a plate (27) which in its turn can rotate about pin (27a). Plate (27) is also fitted with a slot (27b) in order to be able to adjust set-screw (28). This particular way, already well known, of connecting said motor to supporting plates (3a) and/or (3b) allows to move said motor and therefore properly tension said chain (25).

The mentioned electric motors are usually not fed during the stringing of the conductors and/or bundles of conductors on the series of suspension devices suspended from all towers between the brake and the winch, but after all positioning and pre-sagging operations have been completed. As mentioned earlier, when a power line crosses mountains and/or hills the commonly used pulley units, the strings of insulators, and the conductors become subject to loads which are not perfectly vertical, or in other words, to longitudinal unbalances. While stringing, the pulley units and the insulators will therefore be displaced out-of-plumb, and even though the conductors will be pulled to the right degree of tension (pre-sagging), the spans of said conductors between one tower and the other will not describe the right sagging, or in other words the conductors will not be perfectly sagged. In these cases it is necessary to bring the insulators back to a perfect plumb before the conductors can be clamp-in, or in other words the conductors have to be lifted and pulled (sagged) to correct and undo said longitudinal unbalances.

In view of the just mentioned problem, the present invention reveals another very important characteristic. In presence of longitudinal unbalances, once the positioning and pre-sagging of the conductors has been completed, the electric motors (for example motors (26)) are fed. At this point, the motors act on said rollers (2) or (2m) and/or endless belt (14) and/or jaws (G1) (G2) (FIG. 4), and cause all conductors and/or bundles of conductors and all strings of insulators to slide for various centimeters and/or meters so that: 1) said insulators will be automatically plumbed, and 2) the conductor and/or conductors will be automatically and perfectly sagged. The rotatory motion of the motors will obviously always be in the right direction so as to allow said automatic plumbing, and/or the return of the insulators to a perfectly vertical position.

Thanks to special verticality sensors mounted on each frame (shown schematically as sm), all the above mentioned automatic operations can be controlled by one worker (on the ground), and/or by one worker on a tower. It is to be understood that said sensors could also be associated with a central-control system cm.

When the geared motors are associated to said rollers and/or said endless belt (see FIG. 10), a right degree of friction between the conductors and said rollers and/or belt is required in order to bring all insulators back to verticality. When the weight of each conductor on each pair of trajectory sectors is not enough to ensure said right degree of friction, some counter-rollers (not illustrated) have to be applied on top of each conductor in order to generate said right degree of friction.

The need for the mentioned counter-rollers can be completely eliminated through the preferred use of jaws (G1) and (G2) mounted in the central space between the two trajectory sectors (SS3) and (SS4) described in FIG. 4. Thanks to said geared-motors (MR1) and/or (MR2), and suitable verticality sensors, (not illustrated), said jaws (G1) and (G2) will, one at the time and/or one after the other, tighten the conductor, grasp it, and pull it with repeated operations until the right sagging of said conductor will be achieved and consequently till said insulators will be perfectly plumbed. It is to be understood that the intermittent working of said jaws allows one pair of jaws (G1) to tighten and pull the conductor while the other jaws (G2) are in reverse motion; once the idle reverse motion of jaws (G2) has been completed, jaws (G2) will tighten the conductor before jaws (G1) release it to perform their own idle reverse motion. Once said verticality sensors generate pulses to indicate that said verticality has been achieved, both jaws (G1) and (G2) will simultaneously grasp and lock the conductor now perfectly sagged.

FIGS. 12 and 13 show one possible alternative of a frame (1) fitted to support a bundle (for example) of three conductors (C1), (C2), and (C3). With this type of frame the three conductors will automatically undertake their final position, corresponding to the prescribed final geometric configuration (equilateral triangle), while been strung and/or positioned on the series of suspension units. In fact, this frame has been fitted: 1) with a pair of trajectory sectors per each conductor, each trajectory sector being of the same kind illustrated in FIGS. 1 and 5, and 2) with an additional central slide (SC) for supporting the draw cable (T). When draw cable (T), connected to said three conductors, is pulled by the winch, each conductor of said bundle will be positioned on its respective couple of trajectory sectors. Conductors (C1) and (C2) will be directly positioned on their respective coupled of trajectory sectors (SSa) and (SSb), and conductor (C3) will automatically slide through guide (G) and reach trajectory sectors (SSc).

As illustrated in FIG. 1 and 5, each trajectory sector is mounted on the frame by means of a slide (4), so that once all conductors have been clamped-in, by inserting one clamp (M) in the central space between each couple of trajectory sectors (only one clamp has been illustrated), all trajectory sectors can be unloaded of the weight of the conductors, and the whole suspension device can be brought back to the ground. FIG. 13 also shows that conductors (C1) and (C2) can be directly clamped-in to plate (33) in correspodence of clamp-in points (AM1) and (AM2), while in order to clamp-in conductor (C3), slide (SC), has to be first removed. It is to be understood that while slide (SC) can be easily removed because free of any loads (draw cable (T) is not resting on said slide once the conductors are all in place), all clamp-in points (AM1), (AM2), (and (AM3) not illustrated), of plate (33) are also perfectly free, that is to say that frame (1) and consequently all couples of trajectory sectors (SSa), (SSb), and (SSc) do not have to be removed before the clamp-in operation has been completed. As a matter of fact, plate (34), connected to plates (30A) and (30B) of said frame (1), overlaps plate (33) from the top consequently leaving the lower end of said plate (33) and the clamp-in points completely free. It is obvious that if necessary at least one trajectory sector of each pair of trajectory sectors—(SSa) (SSb) and (SSc)—can be fitted with at least one geared/electric motor (as for example illustrated in FIG. 10) for the automatic plumbing of the insulators and the automatic sagging of the conductors.

Figure 14:
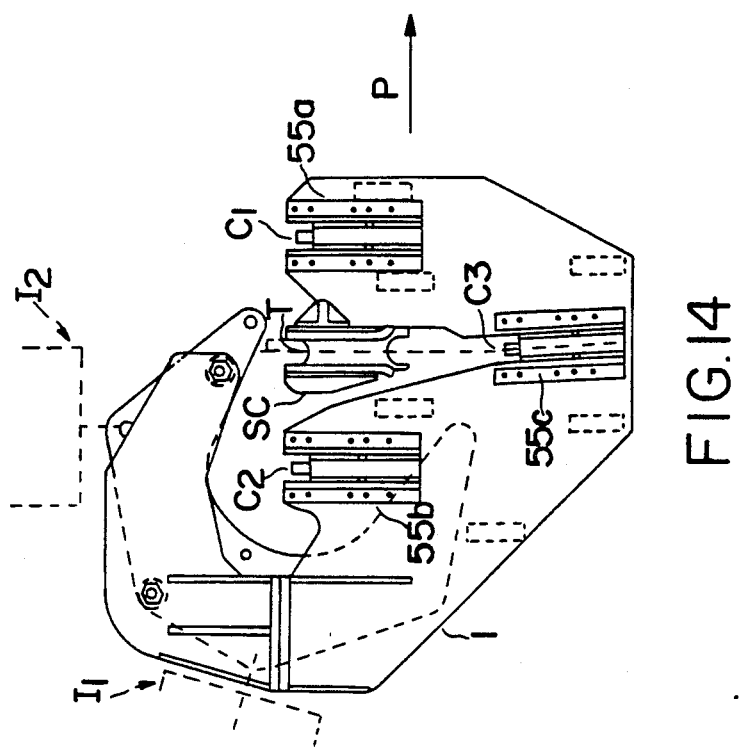
FIGS. 14 and 15 show a similar suspension device for stringing a bundle of these conductors on angle towers.
Figure 15:
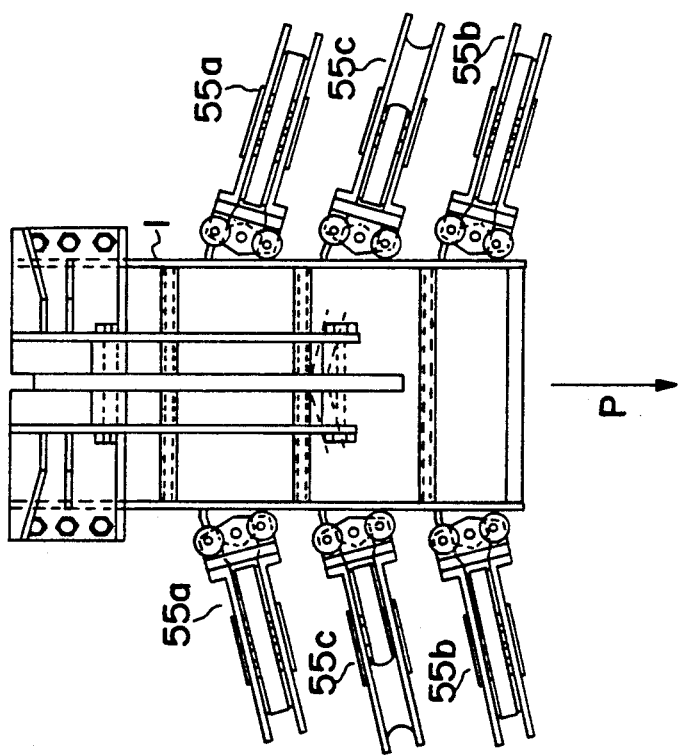

FIGS. 14 and 15 show an additional alternative for frame (1). In this case the frame has been adjusted to be suspended from the insulators of angle towers, and each pair of trajectory sectors has been fitted as illustrated in FIG. 9. This frame and each of these couples of trajectory sectors have therefore been fitted to support: 1) the load of the conductors, and 2) the resultant force (indicated with arrow (P)) of the deviation angle (see FIG. 9) of said conductors.

FIGS. 16 to 19 show some details of the preferred disposition and shape of rollers (R1), (R2), and (R3) of a trajectory sector (SS3) (and/or (SS4)) (see also FIG. 4). This alternative is the preferred one because it allows to use the same trajectory sectors for either line and/or angle towers, without the need of inserting and/or removing any additional devices.

Rollers (R1), (R2), and (R3) have different longitudinal dimensions, profiles, and supporting surface from one an other. The special configuration of said rollers allows the conductor to: 1) run in the direction indicated by arrows (F4) and (F3) (FIG. 16), and/or 2) run through any transversal direction angles starting from a minimum of for example 1 degree of deviation up to angles equal to twice $\frac{1}{2}AD$. When the axis of rotation of said rollers are perfectly perpendicular to plates (L), the maximum deviation angle that said trajectory sectors (SS3) and (SS4) (which are for example 200 mm. wide) can sustain, when for example a 30 mm. diameter conductor is passing through, is approximately equal to 60 degrees.

Figure 17:
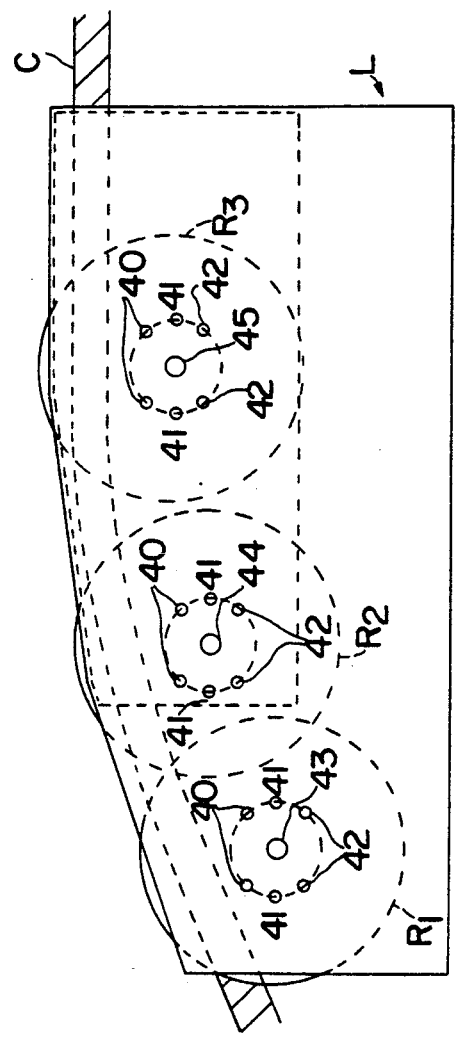
FIG. 17 is a schematic lateral view of the same trajectory sector showing the disposition of said rollers.
Figure 19:
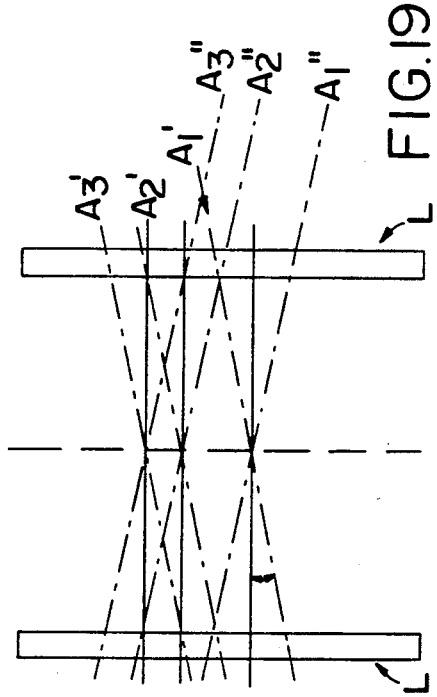
FIGS. 18 and 19 are two front views of the same trajectory sector showing the position of the rotation axis of said rollers.
Figure 18:
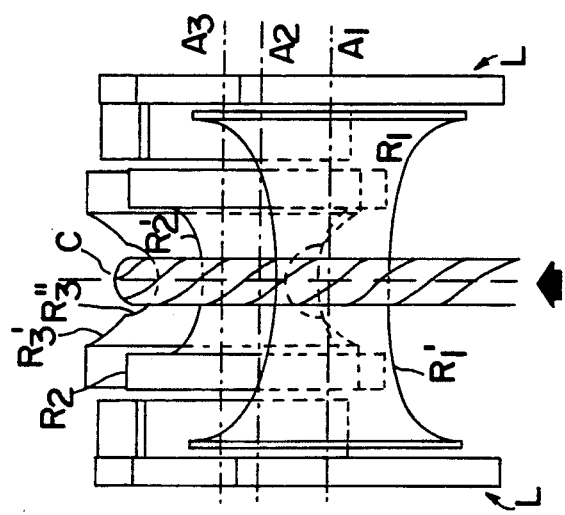

FIG. 17 shows the the couple of plates (L) that support the rollers are fitted with more series of through-holes (40), (41), and (42). These series of through-holes are used to tilt pins (43), (44), and (45) in order to change the inclination the axis of rotation of said rollers (R1), (R2), and (R3). FIG. 18 is a front view of said trajectory sector (SS3) where the axis of rotation (A1), (A2), and (A3) of said rollers are perfectly perpendicular to plates (L). This is the case where the maximum transversal angle of deviation allowed to the conductor (C) is approximately equal to 60 degrees. By tilting said axis (see FIG. 19) either according to positions (A1'), (A2'), and (A3') or positions (A1''), (A2''), and (A3''), that is to say by mounting said pins (43), (44), and (45) in corresppondence of through-holes (40) (41) on one plate (L) and (41) (42) on the other plate (L), the maximum transversal angle of deviation allowed to a conductor (C) (when the diameter of said conductor is equal to 30 mm. and the distance between plates (L) is equal to 200 mm.) becomes approximately equal to 80 degrees. Said tilting of said axis of rotation also grants stability to oscillations even in windy conditions to conductors and/or any other type of cable used.

Figure 16:
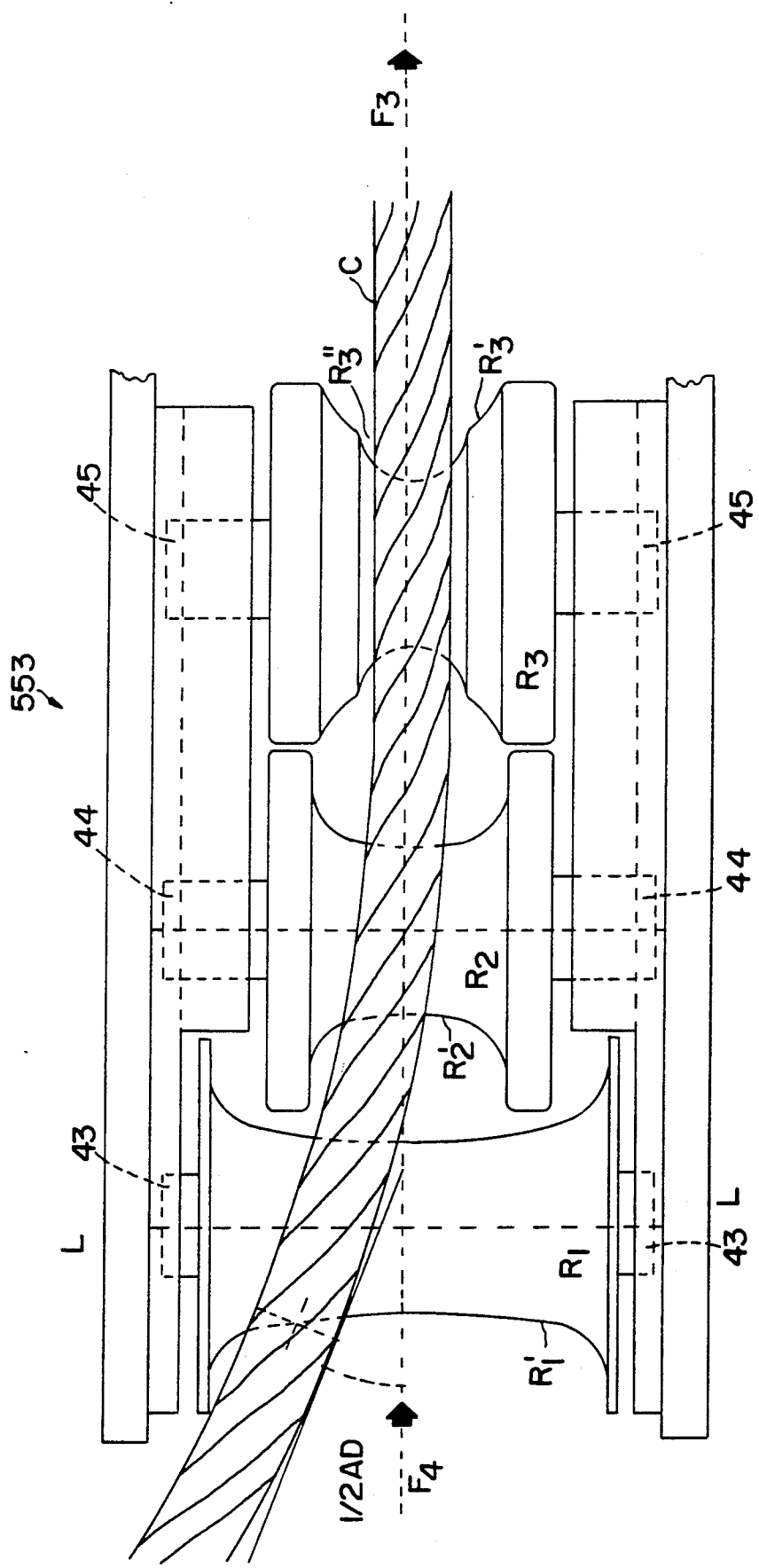
FIG. 16 is a top view illustrating the preferred dimensions and profiles of a series of rollers of one trajectory sector of the type illustrated in FIG. 4.

FIGS. 16 and 18 also show the special concave profile of each roller. In fact, while rollers (R1) and (R2) have profiles (R1') and (R2'') similar to an elliptic hyperboloid, the profile of roller (R3) is actually formed by two different geometric shapes: (R3') similar to an elliptic hyperboloid, and (R3'') similar to a hyperbolic hyperboloid. The development of the different concave profiles of each roller (R1), (R2), and (R3) (see FIG. 16 and 18) allows: 1) to be able to string conductors with different diameters using the same rollers (the maximum transversal angle of deviation allowed to each of said conductors will obviously change according to the size of the conductors and/or the distance between the two plates (L)), and 2) to ensure that said conductors can be pulled through transversal angles of deviation without neither damaging the conductors nor the rollers.

Thanks to the special longitudinal sizes and profiles of said rollers (R1), (R2), and (R3) and the possibility of changing the inclination of the axis of rotation of said rollers, the sectors do not have to be mounted on said vertical pins (11) (FIG. 5) any more, and said additional rollers (22) (FIG. 9) do not need to be inserted in the central space between each pair of sectors any more either.

Figure 20:
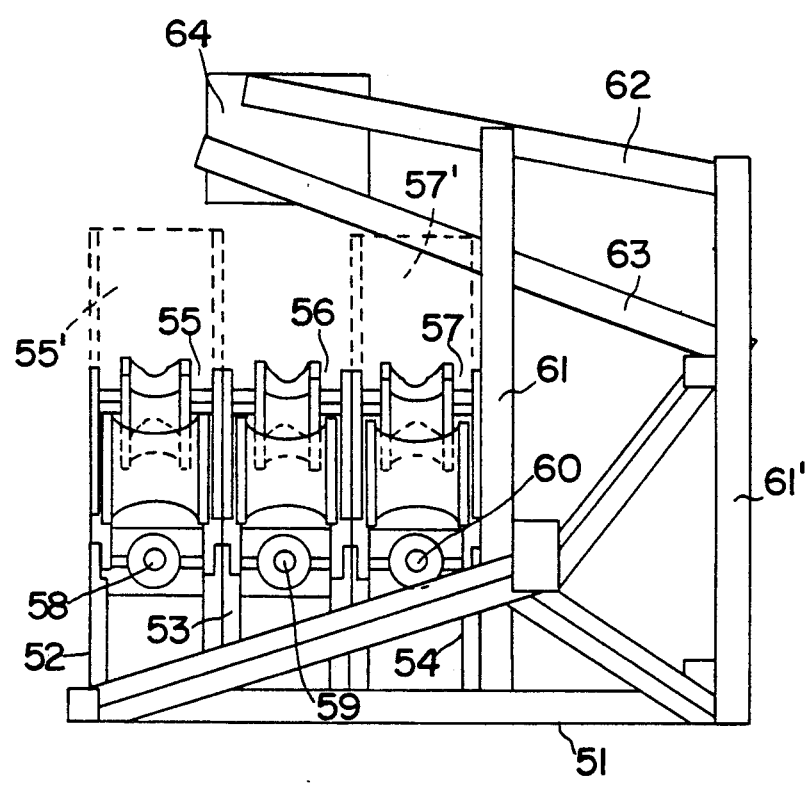
FIG. 20 is a lateral view of the preferred type of suspension frame for stringing a bundle of three conductors on both line and angle towers.

FIG. 20 finally illustrates the preferred type of frame. This frame has a reticular structure which allows to further decrease the overall weight of the whole suspension device. It is constituted with rods rather than plates each rod being preferably made with alloy and/or other material channel sections. This figure shows that the reticular base (51) of this frame can support one, two, and/or three jacks (52), (53), and (54). Each jack supports a pair of trajectory sectors (55), (56), and (57) of the same type illustrate in FIGS. 4 and 16 to 19. When using this type of frame, the conductors (not illustrated) are strung and positioned on their respective pairs of trajectory sectors when said trajectory sectors are laying on the same horizontal plane. Jacks (52), (53), and (54), allow: 1) to tilt, if necessary, the pairs of trajectory sectors (as compared to the horizontal plane of base (51) and the longitudinal axis of the conductors), in order to decrease the influence of longitudinal unbalances on the insulators and the conductors, 2) once the conductors have been strung and pre-sagged, to position said conductors according to the prescribed geometric configuration (for example position (55') and (57') of trajectory sectors (55) and (57)), and 3) once the conductors have been perfectly sagged and the insulators perfectly plumbed (thanks for example to jaws (G1) and (G2) illustrated FIG. 4), and once the conductors have been clamped-in, to unload the weight of each conductor from each pair of trajectory sectors and then remove the whole suspenstion device.

The functions of jacks (52), (53), and (54) can all be accomplished by hand-operating set-screws (58), (59), and (60) or by acting on said screws by means of one or more remote-controlled electric motors.

The frame described in this figure also comprises a series of vertical rods (60) and (61), and a plurality of cross members (62) (63) which converge towards interface (64). Interface (64), which is required to anchor the whole suspension device to the insulators, is fitted with one or more grooves (not shown) to overlap to plate

(33) (plate illustrated in FIG. 13). By integrating said interface (64) with some check-pins (not illustrated), the anchoring systems will have a tensile strength even greater than the tensile strength of the insulators themselves. It is to be understood that this anchoring system also prevents any relative movement between said plate (33) and said suspension frame.

This reticular frame illustrated in FIG. 20, has on overall "C" shape (open on one side) as it was the case for the frames illustrated in FIGS. 12 to 15, but on the other hand, even though it might seem to be more fragile than the other ones it is actually much stronger, has a wider side opening, and it weighs less.

Finally, it is also to be noticed that this reticular frame can be very easily adapted to support any number of jacks and/or pairs of trajectory sectors for any number of conductors in a bundle to be positioned according to any geometric configuration.

I claim:

1. Suspension device for the stringing of electric conductors (C) for overhead power lines, comprising: a suspension frame (1) adapted to be anchored to a crossarm of a tower of the line, and means for the support and sliding of the conductors (C), said support and sliding means comprising, for each conductor, a plurality of support rollers (2, 2') rotating about parallel pins, said rollers being aligned one after the other along a curved trajectory defining a support and sliding surface for the conductor, said support rollers (2, 2') for each conductor being divided in two groups forming a pair of trajectory sectors (SS1, SS2), said sectors (SS1, SS2) of each pair supporting each conductor (C) being mounted on the suspension frame (1) in specular symmetry with respect to a central vertical suspension axis of said frame, said two sectors of each pair being mounted on a common support crossmember (P1) and being mutually spaced, said device further including lifting and lowering means (5, 5a, 8, 8', 8", 9) liked to said sectors, for moving the sectors in a substantially vertical direction, said lifting and lowering means acting on said common support crossmember (P1).

2. Device as in claim 1, wherein the suspension frame comprises a free central space along its vertical suspension axis, and the two sectors are symmetrically positioned on both sides of said central space.

3. Device as in claim 2, wherein said free central space has a transversal dimension exceeding the length of an anchor and suspension clamp (M) for the conductor (C).

4. Device as in claim 2, wherein said free central space has a transversal dimension exceeding the length of an anchor and suspension clamp (M) plus the respective fittings.

5. Device as in claim 1, wherein said lifting and lowering means move each pair of sectors from a lifted working position, in which the rollers (2, 2') support the load of the conductor (C), to a lowered rest position, in which said rollers are unloaded of the weight of the conductor.

6. Device as in claim 5, wherein said common support crossmember (P1) is mounted on the suspension frame by means of a pantograph support (8, 8'), and said lifting and lowering means (9) control the opening of the pantograph.

7. Device as in claim 6, wherein said pantograph support comprises a double pantograph (8, 8', 8") and said crossmember supporting the pair of sectors is movable vertically and/or in a direction slightly oblique with respect to the vertical direction.

8. Device as in claim 5, wherein said lifting and lowering means consist of adjusting screws (5).

9. Device as in claim 8, further including driving means for operating said adjusting screws.

10. Device as in claim 9, wherein said driving means comprise electric motors fed with low voltage.

11. Device as in claim 10, further including electric insulation means interposed between the conductors and said motors, said low voltage being fed through said conductors.

12. Device as in claim 1, comprising means for shifting (26, 2, 2m, 14, 25, G1, G2) the conductor with respect to the pair of sectors supporting the same.

13. Device as in claim 12, wherein said shifting means comprise motor means (26) associated to at least one of the support rollers (2, 2m) of each sector and adapted to cause its rotation in either of the two sliding directions of the conductor.

14. Device as in claim 13, wherein said shifting means comprise at least one supplementary wheel, driven by motor means and associated to each trajectory sector, said wheel being applied by pressure onto the conductor.

15. Device as in claim 12, wherein said shifting means comprise two opposed driving wheels, which clamp the conductor on diametrically opposite sides and which are driven by common motor means.

16. Device as in claim 12, wherein said shifting means comprise at least one pair of jaws (G1, G2) for clamping the conductor, each jaw being mounted on a respective slide sliding parallel to the conductor, and motor means (MR1, MR2) associated to each of said slides for controlling their forward movement with the jaw clamping the conductor and, respectively, their backward movement with an open jaw.

17. Device as in claim 16, wherein the forward movement of one of the clamping jaws is controlled simultaneously with the backward movement of the other jaw, said forward movement taking place in either of the two sliding directions of the conductor.

18. Device as in claim 17, wherein said clamping jaws are housed in a free central area of the suspension frame, between each pair of sectors.

19. Device as in claim 12, further comprising verticality sensors associated to said suspension frame for generating signals.

20. Device as in claim 19, further comprising automatic control means associated to each suspension frame for operating said conductor shifting means in response to signals generated from said sensors.

21. Device as in claim 20, wherein said automatic control means include means to lock the conductor with respect to the suspension frame.

22. Device as in claim 1, wherein the bearing surfaces of the support rollers of each trajectory sector have a concave profile.

23. Device as in claim 22, wherein said concave bearing surface has raised end edges.

24. Device as in claim 22, wherein said concave bearing surface has a double-groove profile (R3', R3").

25. Device as in claim 22, wherein the concave profile (R1') of said bearing surface of the support rollers comprises an arched central portion with wide curvature radius and arched end portions with a small curvature radius.

26. Device as in claim 26, wherein said support rollers have a profile similar to an elliptical hyperboloid.

27. Device as in claim 26, wherein said support rollers have a profile partly similar to an elliptical hyperboloid and partly similar to an hyperbolic hyperboloid.

28. Device as in claim 22, wherein the support rollers of one sector have different lengths, the smallest roller (R3) being the one closer to the central suspension axis.

29. Device as in claim 22, wherein the support rollers of one sector have different radiuses, the roller with the smallest radius being the one (R3) closer to the central suspension axis.

30. Device as in claim 1, wherein the support rollers of each of said sectors are mounted rotating about pins carried by a support bracket consisting of a pair of stiffly interconnected and mutually spaced plates (L).

31. Device as in claim 30, wherein said plates (L) of each support bracket are parallel and said support rollers all have the same length.

32. Device as in claim 30, wherein said plates of each support bracket are divergent and said rollers have progressively increasing lengths, starting from the central suspension axis.

33. Device as in claim 30, wherein each of the support rollers is mounted rotating about a pin, which is anchored in a fixed position to said pair of plates.

34. Device as in claim 30, wherein each of the support rollers is mounted rotating about a pin, the position of which is adjustable with respect to said pair of plates.

35. Device as in claim 34, wherein the pin of each of the support rollers is mounted with its ends on two supplementary support plates, each of which is adapted to be anchored in an adjusted position onto one of the plates forming said support bracket.

36. Device as in claim 34, further including means for setting each of the pins (43, 44, 45) of said support rollers in an inclined position.

37. Device as in claim 36, wherein each of the plates of said pair has a plurality of seats (40, 41, 42) for housing the ends of each of the pins (43, 44, 45) of said support rollers.

* * * * *